(12) United States Patent
Christopher et al.

(10) Patent No.: US 9,910,664 B2
(45) Date of Patent: Mar. 6, 2018

(54) SYSTEM AND METHOD OF ONLINE FIRMWARE UPDATE FOR BASEBOARD MANAGEMENT CONTROLLER (BMC) DEVICES

(71) Applicant: AMERICAN MEGATRENDS, INC., Norcross, GA (US)

(72) Inventors: Samvinesh Christopher, Suwanee, GA (US); Anurag Bhatia, Lilburn, GA (US); Winston Thangapandian, Duluth, GA (US); Suresh Vijayakumar, Chennai (IN); Balasubramanian Chandrasekaran, Chennai (IN)

(73) Assignee: AMERICAN MEGATRENDS, INC., Norcross, GA (US)

( * ) Notice: Subject to any disclaimer, the term of this patent is extended or adjusted under 35 U.S.C. 154(b) by 291 days.

(21) Appl. No.: 14/703,156

(22) Filed: May 4, 2015

(65) Prior Publication Data
US 2016/0328229 A1   Nov. 10, 2016

(51) Int. Cl.
*G06F 9/44*      (2006.01)
*G06F 9/445*     (2018.01)
*G06F 17/30*     (2006.01)

(52) U.S. Cl.
CPC .......... *G06F 8/665* (2013.01); *G06F 17/3007* (2013.01)

(58) Field of Classification Search
CPC ........................................................ G06F 9/44
USPC .................................................. 717/168–173
See application file for complete search history.

(56) References Cited

U.S. PATENT DOCUMENTS

| | | | | |
|---|---|---|---|---|
| 7,673,023 | B1* | 3/2010 | Nelson ................... | G06F 15/177 709/217 |
| 2002/0138699 | A1* | 9/2002 | Okamura ............ | G06F 12/0888 711/133 |
| 2007/0294685 | A1* | 12/2007 | Oh ............................ | G06F 8/68 717/168 |
| 2010/0122246 | A1* | 5/2010 | Gesquiere ................. | G06F 8/65 717/173 |
| 2010/0228960 | A1* | 9/2010 | Huang ....................... | G06F 8/65 713/100 |
| 2011/0271270 | A1* | 11/2011 | Bowen ...................... | G06F 8/67 717/171 |

(Continued)

*Primary Examiner* — Jae Jeon
(74) *Attorney, Agent, or Firm* — Locke Lord LLP; Tim Tingkang Xia, Esq.

(57) ABSTRACT

A system includes a baseboard management controller (BMC), capable of online update of the BMC without shutting down any services. The BMC includes a processor, a volatile memory configured to perform multiple service instances, and a non-volatile memory storing a computer executable code and a root file system. The root file system includes multiple service modules as origin of the service instances. The computer executable code, when executed at the processor, is configured to: receive an update command and perform an update process based on the update command. The update process includes: copying the root file system from the non-volatile memory to the volatile memory; switching the origin of the service instances to the copy of the root file system; receiving an update root file system code; and writing the update root file system code to the non-volatile memory to obtain an updated root file system.

19 Claims, 6 Drawing Sheets

(56) References Cited

U.S. PATENT DOCUMENTS

| | | | |
|---|---|---|---|
| 2012/0084552 A1* | 4/2012 | Sakthikumar | G06F 21/572 713/100 |
| 2012/0272033 A1* | 10/2012 | Murphy | G06F 17/30138 711/171 |
| 2013/0185402 A1* | 7/2013 | Ayanam | H04L 41/0813 709/221 |
| 2014/0348176 A1* | 11/2014 | Sprague | H04L 49/35 370/401 |

* cited by examiner

SYSTEM AND METHOD OF ONLINE FIRMWARE UPDATE FOR BASEBOARD MANAGEMENT CONTROLLER (BMC) DEVICES

FIELD

The present disclosure relates generally to baseboard management controller (BMC) technology, and more particularly to systems and methods of online BMC firmware update without shutting down any services.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Embedded system runs real-time operating system (RTOS) or embedded Linux which have the file system in flash devices. To update firmware, the flash devices have to be erased and updated. This requires full or partial shutdown of services and followed by an automatic reboot of the device.

A baseboard management controller (BMC) refers to a specialized microcontroller that manages the interface between system management software and platform hardware. The BMC may be embedded on the baseboard or motherboard of a computer, generally a host system or a server. For example, different types of sensors can be built into the computer system, and the BMC reads these sensors to obtain parameters such as temperature, cooling fan speeds, power status, operating system (OS) status, etc. BMC device monitors and manages components of server hardware. Thus, it is needed for the BMC to be up and fully active during the entire time the server is powered up.

Therefore, an unaddressed need exists in the art to address the aforementioned deficiencies and inadequacies.

SUMMARY

In one aspect, the disclosure is directed to a system including a baseboard management controller (BMC). In certain embodiments, the BMC includes a processor, a volatile memory configured to perform a plurality of service instances, and a non-volatile memory storing a computer executable code and a root file system. The root file system is configured as an origin of the plurality of service instances. The computer executable code, when executed at the processor, is configured to receive an update command, and perform an update process based on the update command. The update process includes:

copying the root file system from the non-volatile memory to the volatile memory to form a copy of the root file system in the volatile memory;

switching the origin of the service instances from the root file system stored in the non-volatile memory to the copy of the root file system stored in the volatile memory;

receiving an update root file system code; and writing the update root file system code to the non-volatile memory to obtain an updated root file system in the non-volatile memory.

In certain embodiments, the root file system includes a plurality of service modules each corresponding to one of the service instances. Each of the service modules, when executed at the processor, is configured to create the corresponding one of the service instances in the volatile memory.

In certain embodiments, when the BMC is rebooted after performing the update process, the service instances are configured to be recreated by executing the service modules of the updated root file system stored in the non-volatile memory.

In certain embodiments, the computer executable code includes a flasher module. The flasher module is configured to: receive the update command, and perform the update process based on the update command.

In certain embodiments, the update command and the update root file system code are received from a remote computing device connected to the BMC via a network.

In certain embodiments, the update process further includes: in response to the update command, sending a request to the remote computing device via the network to request the update root file system code from the remote computing device.

In certain embodiments, the volatile memory is a random-access memory (RAM), and the non-volatile memory is a flash memory.

In certain embodiments, the computer executable code, when executed at the processor, is configured to perform the update process based on the update command by:

retrieving version information of the update root file system code;

retrieving version information of the root file system in the non-volatile memory;

comparing the version information of the update root file system code with the version information of the root file system in the non-volatile memory; and performing the update process when the version information of the update root file system code is different from the version information of the root file system in the non-volatile memory.

In another aspect, the disclosure is directed to a method of firmware update. In certain embodiments, the method includes:

receiving, at a processor of a baseboard management controller (BMC), an update command, wherein the BMC comprises the processor, a volatile memory configured to perform a plurality of service instances, and a non-volatile memory a root file system, and wherein the root file system is configured as an origin of the plurality of service instances; and performing, at the processor of the BMC, an update process based on the update command, the update process comprising:

copying the root file system from the non-volatile memory to the volatile memory to form a copy of the root file system in the volatile memory;

switching the origin of the service instances from the root file system stored in the non-volatile memory to the copy of the root file system stored in the volatile memory;

receiving an update root file system code; and writing the update root file system code to the non-volatile memory to obtain an updated root file system in the non-volatile memory.

In certain embodiments, the root file system includes a plurality of service modules each corresponding to one of the service instances. Each of the service modules, when executed at the processor, is configured to create the corresponding one of the service instances in the volatile memory.

In certain embodiments, the method further includes rebooting the BMC after performing the update process, and executing the service modules of the updated root file system stored in the non-volatile memory to re-create the service instances.

In certain embodiments, the update command and the update root file system code are received from a remote computing device connected to the BMC via a network.

In certain embodiments, the update process further includes: in response to the update command, sending a request to the remote computing device via the network to request the update root file system code from the remote computing device.

In certain embodiments, the update process is performed based on the update command by:

retrieving version information of the update root file system code;

retrieving version information of the root file system in the non-volatile memory;

comparing the version information of the update root file system code with the version information of the root file system in the non-volatile memory; and performing the update process when the version information of the update root file system code is different from the version information of the root file system in the non-volatile memory.

In a further aspect, the disclosure is directed to a non-transitory computer readable medium storing computer executable code executable at a processor of a baseboard management controller (BMC). In certain embodiments, the BMC includes the processor, a volatile memory configured to perform a plurality of service instances, and a non-volatile memory storing a root file system. The root file system is configured as an origin of the plurality of service instances. The computer executable code, when executed at the processor of the BMC, is configured to:

receive an update command; and perform an update process based on the update command, the update process comprising:

copying the root file system from the non-volatile memory to the volatile memory to form a copy of the root file system in the volatile memory;

switching the origin of the service instances from the root file system stored in the non-volatile memory to the copy of the root file system stored in the volatile memory;

receiving an update root file system code; and writing the update root file system code to the non-volatile memory to obtain an updated root file system in the non-volatile memory.

In certain embodiments, the root file system includes a plurality of service modules each corresponding to one of the service instances. Each of the service modules, when executed at the processor, is configured to create the corresponding one of the service instances in the volatile memory.

In certain embodiments, the computer executable code, when executed at the processor, is further configured to, after performing the update process: reboot the BMC, and execute the service modules of the updated root file system stored in the non-volatile memory to re-create the service instances.

In certain embodiments, the update command and the update root file system code are received from a remote device connected to the BMC via a network.

In certain embodiments, the update process further includes: in response to the update command, sending a request to the remote computing device via the network to request the update root file system code from the remote computing device.

In certain embodiments, the computer executable code, when executed at the processor, is configured to perform the update process based on the update command by:

retrieving version information of the update root file system code;

retrieving version information of the root file system in the non-volatile memory;

comparing the version information of the update root file system code with the version information of the root file system in the non-volatile memory; and performing the update process when the version information of the update root file system code is different from the version information of the root file system in the non-volatile memory.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

Figure 1:
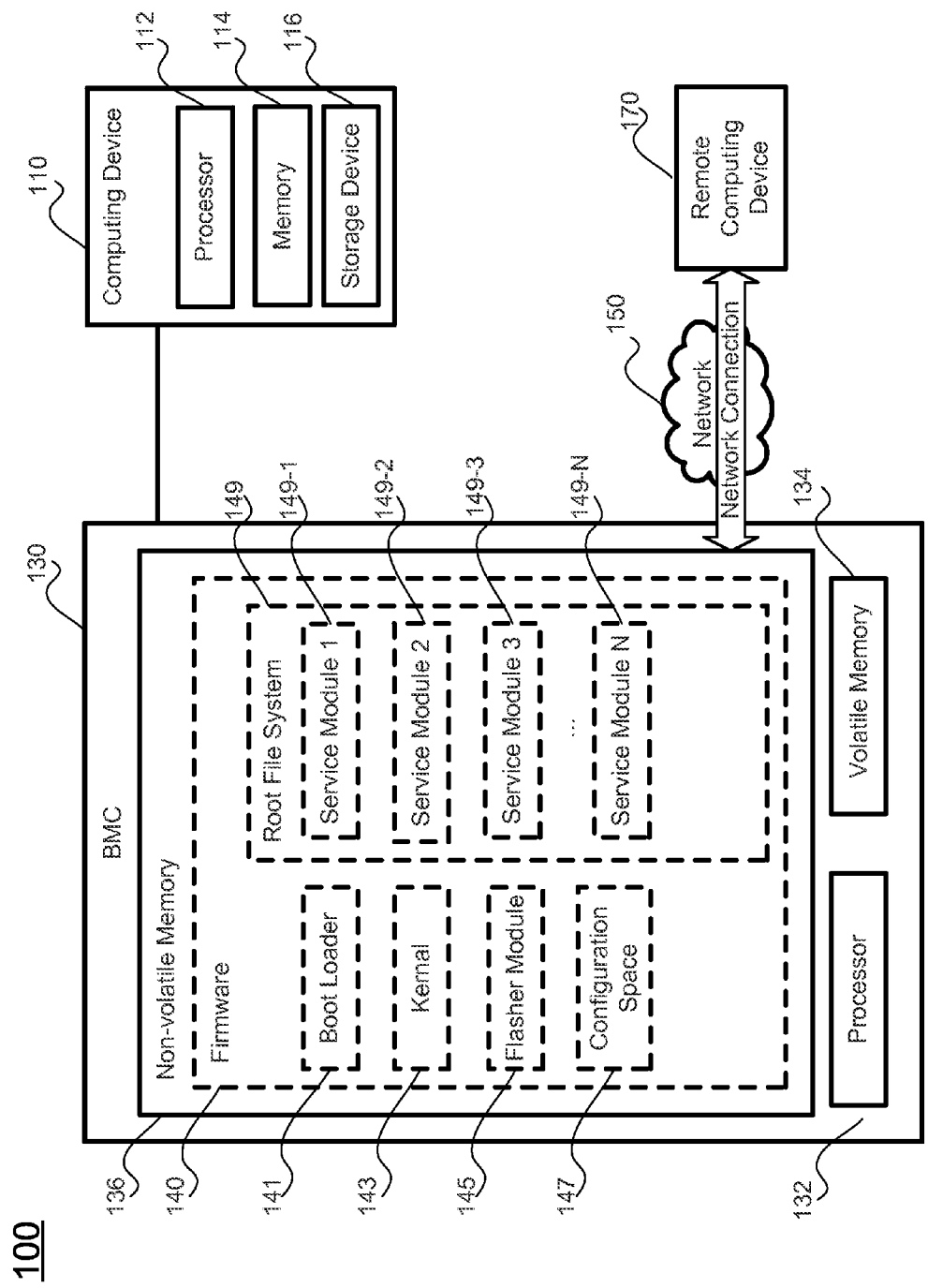
FIG. 1 schematically depicts a system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

As discussed above, a BMC has a flash memory or other types of non-volatile memory to store its firmware and other necessary configuration data.

In one aspect, the present disclosure is directed to a system that is capable of performing online firmware update for BMC devices. In order to achieve online updates without shutting down any services or downgrading the functionality of the BMC, before startup of online firmware update, the root file system in the flash is copied to the random access memory (RAM). Then the operating system is informed to use the copy of the root file system in the RAM as the new root file systems. Now any service to be loaded or unloaded will be originated from the copy of the root file system in the RAM. Then the online firmware update erases the current root file system and writes a new root file system in the flash. During this time, the copy of the root file system in the RAM is the active one and thus all the services will be running without getting affected by the updating process. No immediate reboot is necessary since the BMC is fully active. The administrator can decide when to reboot the BMC. Once the reboot is done, the updated file system from flash will be active.

FIG. 1 schematically depicts a system according to certain embodiments of the present disclosure. As shown in FIG. 1, the system 100 includes a computing device 110 and a BMC 130. The BMC 130 is connected to the computing device 110 via a system interface, or via one or more interfaces replacing or in addition to the system interface, such as a universal serial bus (USB) interface. The system 100 may be a system that incorporates more than one interconnected system, such as a client-server network. Further, the BMC 130 may be connected to a network 150. The network 150 may be a wired or wireless network, and may be of various forms such as a local area network (LAN) or wide area network (WAN) including the Internet. In certain embodiments, the system 100 may include other physical or virtual components not shown in FIG. 1.

In certain embodiments, the system 100 may further include a remote computing device 170. The remote computing device 170 may be a remote server providing services for updating the BMC 130 via the network 150. In certain embodiments, the updating of the BMC 130 can also be performed according to the computing device 110 instead of the remote computing device 170.

The computing device 110 functions as a host computer of the BMC 130. In certain embodiments, the computing device 110 may be a general purpose computer or a headless computer. Generally, the computing device 110 includes a baseboard or the "motherboard" (not shown). The baseboard is a printed circuit board to which a multitude of components or devices may be connected by way of a system bus or other electrical communication paths. Although not explicitly shown in FIG. 1, the components on the baseboard are interconnected, and the layout of the components on the baseboard and the manner of the interconnection between the components on the baseboard is herein referred to as the configuration of the baseboard. One of ordinary skill in the art would appreciate that the configuration of the baseboard may be adjusted or changed according to the necessary design or manufacturing requirements.

The components on the baseboard of the computing device 110 may include, but not limited to, a processor 112, a memory 114, and other required memory and Input/Output (I/O) modules (not shown). In certain embodiments, the BMC 130 may also be a component on the baseboard of the computing device 110. In certain embodiments, the processor 112 and the memory 114 may be embedded on the baseboard, or may be connected to the baseboard through at least one interface. In certain embodiments, the interface may be physical hardware interface such as electrical connectors, buses, ports, cables, terminals, or other I/O devices.

The computing device 110 may further include a storage device 116, which stores multiple software applications, including an operating system (OS). In certain embodiments, the storage device 116 may be connected to the baseboard of the computing device 110. In certain embodiments, the computing device 110 may include at least one I/O device (not shown) for generating and controlling input and output signals of the computing device 110. Examples of the I/O device include keyboards, touch pads, mouse, microphones, display screens, touch screens, or other I/O devices applicable for the computing device 110. Some I/O devices, such as touch screens, are provided for the dual input/output purposes.

The processor 112 is a host processor which is configured to control operation of the computing device 110. In certain embodiments, the processor 112 may be a central processing unit (CPU). The processor 112 may execute any computer executable code or instructions, such as the OS or other applications of the computing device 110. In certain embodiments, the computing device 110 may run on or more than one processor, such as two processors, four processors, eight processors, or any suitable number of processors.

The memory 114 may be a volatile memory, such as the random-access memory (RAM), for storing the data and information during the operation of the computing device 110. In certain embodiments, the memory 114 is in communication with the processor 112 through a system bus (not shown). In certain embodiments, the memory 114 may be a volatile memory array.

The storage device 116 is a non-volatile data storage media for storing the OS and other applications of the computing device 110. Examples of the storage device 116 may include flash memory, memory cards, USB drives, hard drives, floppy disks, optical drives, or any other types of data storage devices.

The BMC 130 is a specialized microcontroller that manages the interface between system management software and platform hardware. In certain embodiments, the BMC 130 may be a service processor (SP). Different types of sensors can be built into the computing device 110, and the BMC 130 reads these sensors to obtain parameters such as temperature, cooling fan speeds, power status, OS status, etc.

The BMC 130 monitors the sensors and can send out-of-band (OOB) alerts to a system administrator of the computing device 110 if any of the parameters do not stay within preset limits, indicating a potential failure of the computing device 110. In certain embodiments, the administrator can also remotely communicate with the BMC 130 from a remote management computer via a network to take remote action to the computing device 110. For example, the administrator may reset the computing device 110 from the remote management computer through the BMC 130, and may obtain system information of the computing device 110 OOB without interrupting the operation of the computing device 110.

As shown in FIG. 1, the BMC 130 includes a processor 132, a volatile memory 134 and a non-volatile memory 136. In certain embodiments, one or more remote computing devices 170 may be connected to the BMC 130 via a network 150. In certain embodiments, the BMC 130 may include other components, such as at least one I/O device (not shown).

The processor 132 controls operation of the BMC 130. The processor 132 may execute the firmware 140 or other codes stored in the BMC 130. In certain embodiments, the BMC 130 may run on or more than one processor.

The volatile memory 134 may be the RAM, which is configured to store the data and information during the operation of the BMC 130. When the BMC 130 restarts, the contents stored in the volatile memory 134 will be lost.

The non-volatile memory 136 is a non-volatile data storage media for storing computer executable code and data required for the operation of the BMC 130, such as a firmware 140 and any other necessary software or firmware components of the BMC 130. Examples of the non-volatile memory 136 may include flash memory, memory cards, USB drives, hard drives, floppy disks, optical drives, or any other types of data storage devices. In certain embodiments, the firmware 140 includes, among other things, a boot loader 141, a kernel 143, a flasher module 145, a configuration space 147, and a root file system 149.

The boot loader 141 is a computer program that loads an operating system, such as the kernel 143 for the BMC 130 after power on. Specifically, when the BMC 130 is powered-up or restarted, the basic input/output (BIOS) performs some initial tests, and then transfers control to the master boot record (MBR) where the boot loader 141 resides. The boot loader 141 is loaded into the volatile memory 134 from the non-volatile memory 136, and the boot loader 141 then loads and executes the processes that finalize the boot, including brings the kernel 143 into the volatile memory 134, providing the kernel 143 with the information it needs to work correctly, switching to an environment that the kernel will like, and transferring control to the kernel 143.

The kernel 143 is the operating system, such as a Linux kernel of the BMC 130. The kernel 143 manages input/output (I/O) requests from software, and translates them into data processing instructions for the processor 132 and other electronic components of the BMC 130. The primary function of the kernel 143 is to mediate access to the BMC 130's resources, including the processor 132, the volatile memory 134, and I/O devices.

The configuration space 147 includes the essential information and data that enables the BMC 130 to operate correctly. In certain embodiments, the configuration space 147 may include the media access control (MAC) address of the BMC 140, kernel boot parameters, environment variables and other customer specific files. In particular, the MAC address provides internet protocol (IP) information available for the BMC 130, which allows network connectivity and network support of the BMC 130 to perform remote management. The kernel boot parameters and the environment variables allow the BMC 130 to properly run the Linux kernel and other monitoring and sensing programs. If the information stored in the configuration space is lost, the BMC 130 may lose its operational functionality. Thus, when the firmware 140 is updated, the configuration space 147 is generally protected such that the information stored in the configuration space remains safe.

In a computer file system, and primarily used in the Unix and Unix-like operating systems, such as the Linux kernel 143, the root directory is the first or top-most directory in a hierarchy. It can be likened to the trunk of a tree, as the starting point where all branches originate from. The root file system 149 is the file system contained on the same memory partition on which the root directory is located; it is the file system on top of which all other file systems are mounted as the system boots up. The root file system 149 includes multiple service modules, such as service module 1, service module 2, service module 3, . . . , service module N as show in FIG. 1 and labeled as 149-1, 149-2, 149-3, . . . , 149-N respectively. In certain embodiments, each of the service modules 149 may include one or more files. The root file system 149 is a predetermined origin of service instances provided by the BMC 130. More precisely, the multiple service modules 149-1 to 149-N stored in the root file system 149 are the origin of the service instances provided by the BMC 130. In certain embodiments, when the BMC 130 intends to provide a service, the BMC 130 executes the corresponding service module to create a corresponding service instance in the volatile memory 134. When the service instances are provided, information may be needed to be retrieved from the corresponding service modules of the root file system 149 according to the status of the service. Therefore, an updating of the root file system 149, which prevent access of the root file system 149 by the service, may affect the performance of the service.

As will be described in detail below, the flasher module 145 is a program module which runs during the flashing process of the BMC 130 for receiving instructions and performing functions to flash the non-volatile memory 136.

The flasher module 145 is configured to receive an update command from a remote computing device 170 or the host computing device 110. In response to receiving the update command, the flasher module 145 is configured to perform an update process based on the update command. Specifically, the flasher module 145 is configured to copy all data in the root file system 149, which includes the service modules and other data, from the non-volatile memory 136 to the volatile memory 134 to form a copy of the root file system 139 in the volatile memory 134, and switch the origin of the service instances from the root file system 149 stored in the non-volatile memory 136 to the copy of the root file system 139 stored in the volatile memory 134. Before the steps of copying and switching, the service instances are performed by the processor 132 using the volatile memory 134, and data may be retrieved from the corresponding service modules of the root file system 149. After the root file system 149 is copied to the volatile memory 134 and the origin of the service instances is switched to the copy of the root file system 139, the service instances are performed by the processor 132 using the volatile memory 134, and data may be retrieved from the corresponding service modules of the copy of the root file system 139. Further, the flasher module 145 is further configured to receive an update root file system code from the remote computing device 170 via the network 150 or from the host computing device 110, and write the update root file system code to the non-volatile memory 136 to obtain an updated root file system 149U in the non-volatile memory 136. Since the service instances are performed by interacting with the corresponding service modules of the copy of the root file system 139 stored in the volatile memory 134, the step of writing the update root file system to the non-volatile memory 136 does not affect the running of the service instances, and no reboot of the BMC 130 is necessary at this stage. In certain embodiments, after the above described update process, according to a predetermined time such as during the night or weekends, or as determined necessary by the administrator, the BMC 130 may be rebooted. After the rebooting, the origin of the service instances performed in the volatile memory is set back to the updated root file system 149U stored in the non-volatile memory 136, and the service modules of the updated root file system 149U stored in the non-volatile memory 136 may be executed to re-create the service instances, therefore accomplishing the whole update process.

In certain embodiments, the firmware 140 may include a monitoring module (not shown) for monitoring status of the computing device 110.

When flashing a BMC remotely from a remote computing device or a host computing device, the flashing procedure typically write the update root file system to the non-volatile memory of the BMC, and requires a reboot after the write process. Without the system described above and the method described below, during the updating of the BMC, services of the BMC may be stopped or affected for certain time. In certain embodiments, the flasher module 145 is configured to perform the following method to avoid the shutting down of the services and reboot of BMC 130 during updating.

Figure 2:
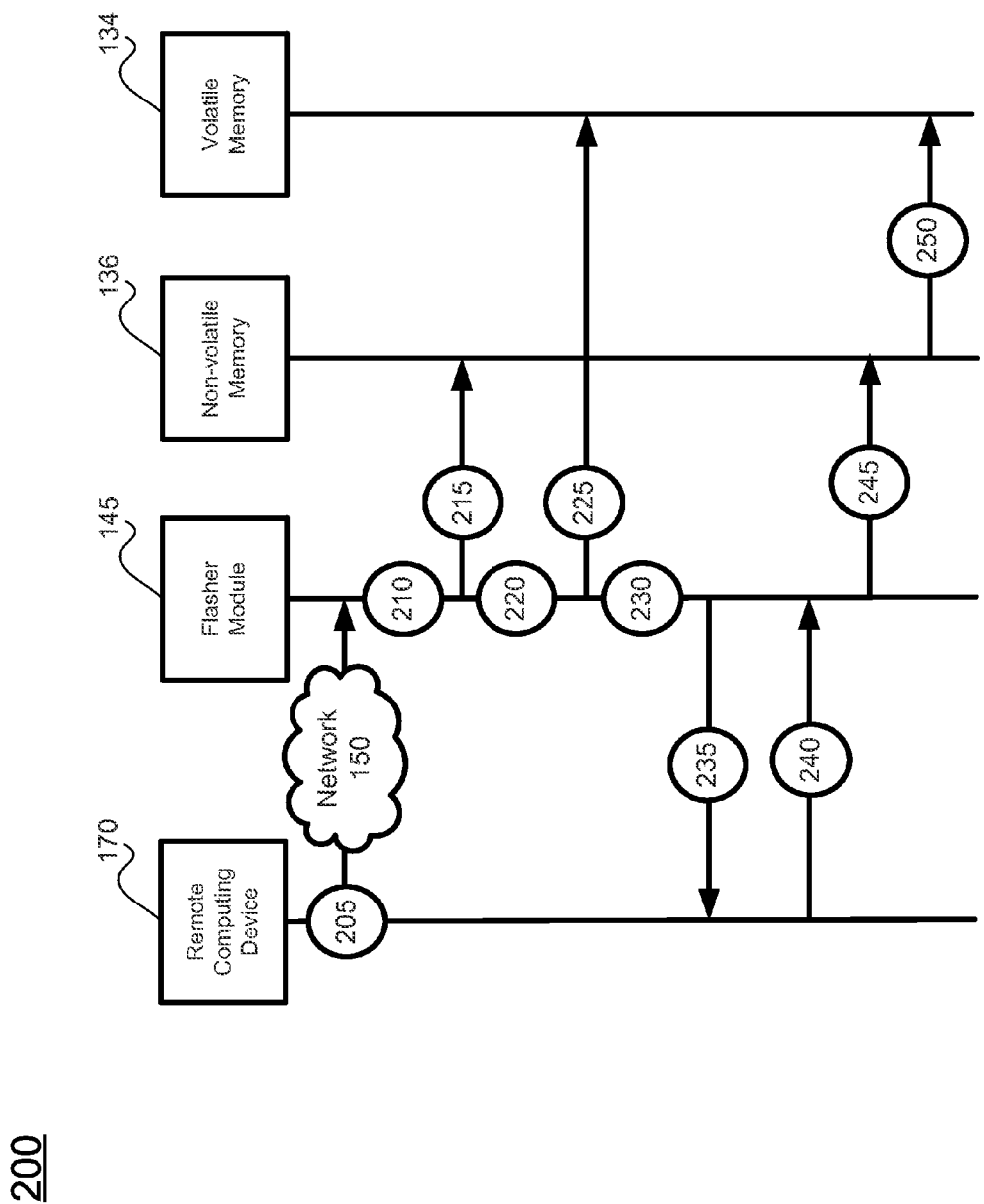
FIG. 2 schematically depicts a method of online firmware update according to certain embodiments of the present disclosure.

FIG. 2 schematically depicts a method of online firmware update for BMC devices of a system. The system may have the same structure as described above in FIG. 1.

In certain embodiments, when the update for the BMC 130 is available online from a remote computing device 170, or the update for the BMC 130 is available from the local computing device 110, or the administrator determines that an update for the BMC 130 is necessary, at operation 205, an update command is sent to the flasher module 145 of the BMC 130 from the remote computing device 170 via the network 150, the local computing device 110, or from the administrator remotely or locally. The update command includes instructions for updating the BMC 130. In certain embodiments, the update command may further include an update root file system code or the update command is sent together with the update root file system code.

In response to the received update command, the flasher module 145 performs an update process based on the update command. In certain embodiments, the update process includes operations 210-245.

As shown in FIG. 2, at operation 210, the flasher module 145 retrieves version information of the update root file system code from the received update command. At operation 215, the flasher module 145 retrieves version information of the root file system in the non-volatile memory 136. Subsequently, at operation 220, the flasher module 145 compares the version information of the update root file system code with the version information of the root file system in the non-volatile memory 136, and determines whether an update is necessary. If the version information of the update root file system code and the version information of the root file system in the non-volatile memory 136 are different, the flasher module continues with the update process. If the version information of the update root file system code and the version information of the root file system in the non-volatile memory 136 are the same, the flasher module will stop the further steps of the update process. In certain embodiments, the operations of 210, 215 and 220 may not be necessary, and the flasher module 145 proceeds to operation 225 in response to receiving the update command at operation 205.

At operation 225, the flasher module 145 copies the root file system 149 from the non-volatile memory 136 to the volatile memory 134, to obtain a copy of the root file system 139 in the volatile memory 134. In certain embodiments, the copying operation 225 may include retrieving the root file system 149 from the non-volatile memory 136 and then copying the retrieved root file system to the volatile memory 134.

Figure 3A:
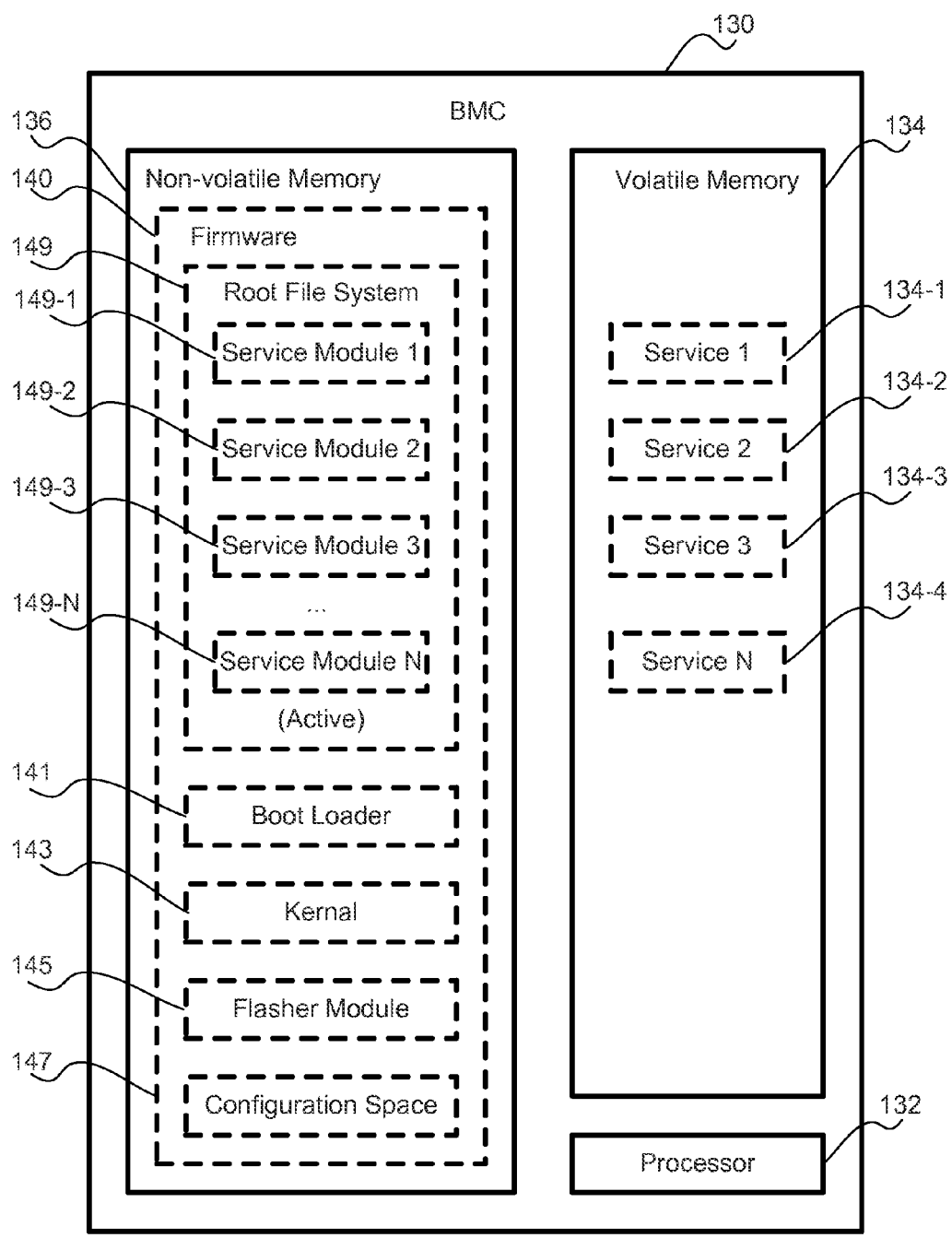
FIG. 3A schematically depicts a status of the BMC during normal operation according to certain embodiments of the present disclosure.

Before the copying operation 225, the system 100 has a status as shown in FIG. 3A, where the root file system 149 includes the service module 1, service module 2, service module 3, . . . , service module N, the root file system 149 is active (meaning that the root file system 149 is the origin of the service instances), and the volatile memory 134 loads and unloads service 1, service 2, service 3, . . . , service N from the root file system 149.

After the copying operation 225, at operation 230, the flasher module 145 switches the origin of the service 1, service 2, service 3, . . . , service N from the root file system 149 to the copy of the root file system 139 stored in the volatile memory 134. In certain embodiments, the flasher module 145 notifies an operating system connected to the BMC to use the copy of the root file system 139 as the new root file system. In certain embodiments, the operating system may be the kernel 143 of the BMC 130, or the OS stored in the storage device 116 of the computing device 110.

Figure 3B:
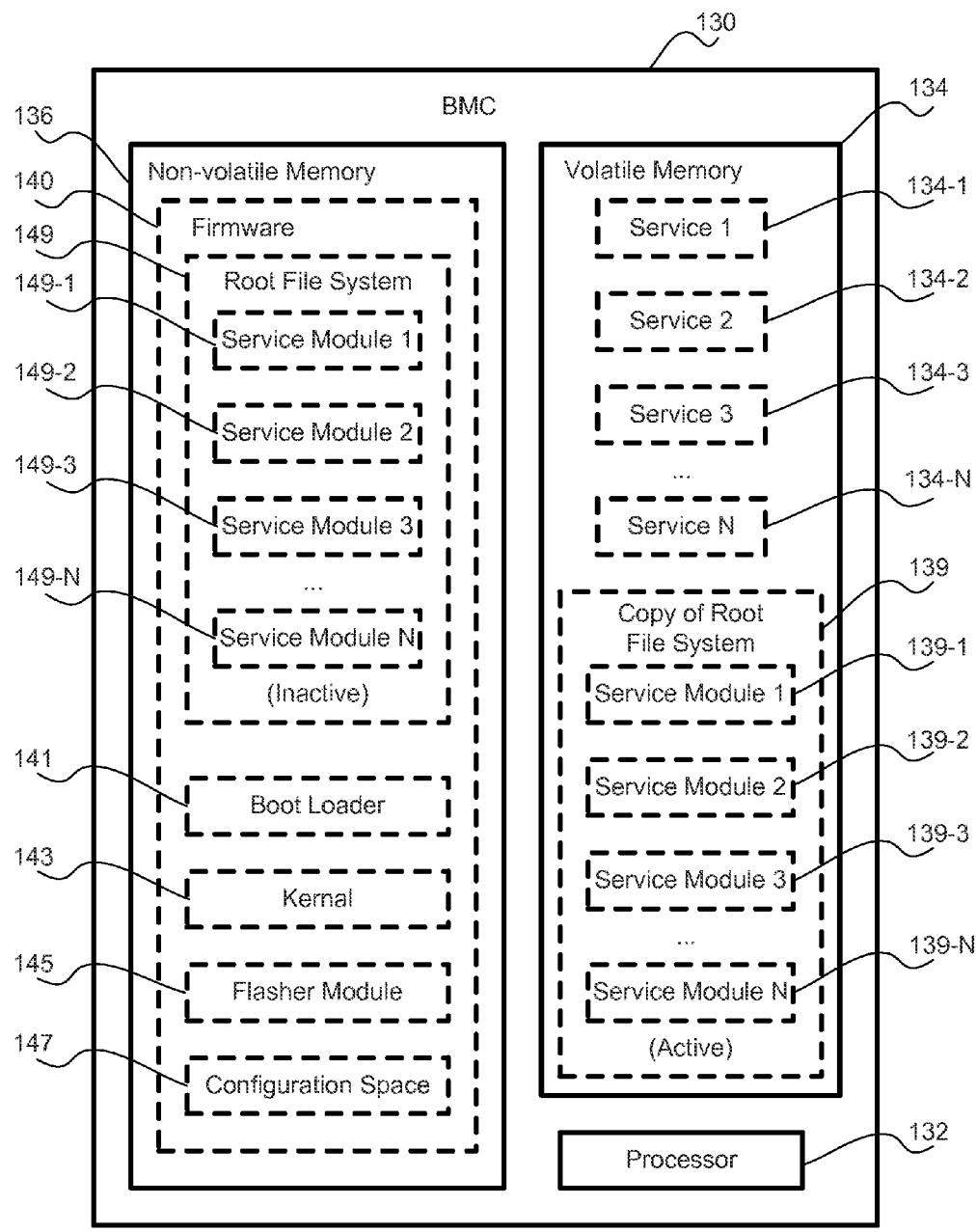
FIG. 3B schematically depicts a status of the BMC according to certain embodiments of the present disclosure, where the origin of the services is switched.

After the operation of switching 230, the system 100 has a status as shown in FIG. 3B, where the root file system 149 is inactive (meaning that the root file system 149 is no longer the origin of the service instances), the copy of the root file system 139 is active, and the volatile memory 134 loads and unloads service 1, service 2, service 3, . . . , service N from the copy of the root file system 139.

Since the origin of the service instances is the copy of the root file system 139 instead of the root file system 149, now the update or change of the root file system 149 will not affect the services performed in the volatile memory 134. Therefore, the root file system 139 may be updated without shutting down any services or downgrading the functionality of the BMC 130.

Accordingly, at operation 235, in response to the update command, the flasher module 145 requests the update root file system code from the remote computing device 170 or other sources corresponding to the update command. In certain embodiments, the operation 235 may not be necessary, and the update root file system code is pushed from the remote computing device 170 or sent together with the update command.

At operation 240, the flasher module 145 receives the update root file system code. In certain embodiments, the operations of 235 and 240 are not necessary, and the update root file system code are received with the update command at operation 205.

In response to receiving the update root file system code, at operation 245, the flasher module 145 writes the update root file system code to the non-volatile memory 136, to obtain updated root file system 149U. In certain embodiments, the write operation 245 may include erasing the root file system 149 stored in the non-volatile memory and then writing the update root file system to the non-volatile memory according to the received update root file system code. In certain embodiments, the write operation 245 may include erasing a first section of the root file system 149 stored in the non-volatile memory and then writing the corresponding first section of the update root file system to the non-volatile memory, and then erasing a second section of the root file system 149 stored in the non-volatile memory and then writing the corresponding first section of the update root file system to the non-volatile memory, until the erasing of the root file system 149 and the writing of the update root file system is accomplished.

Figure 3C:
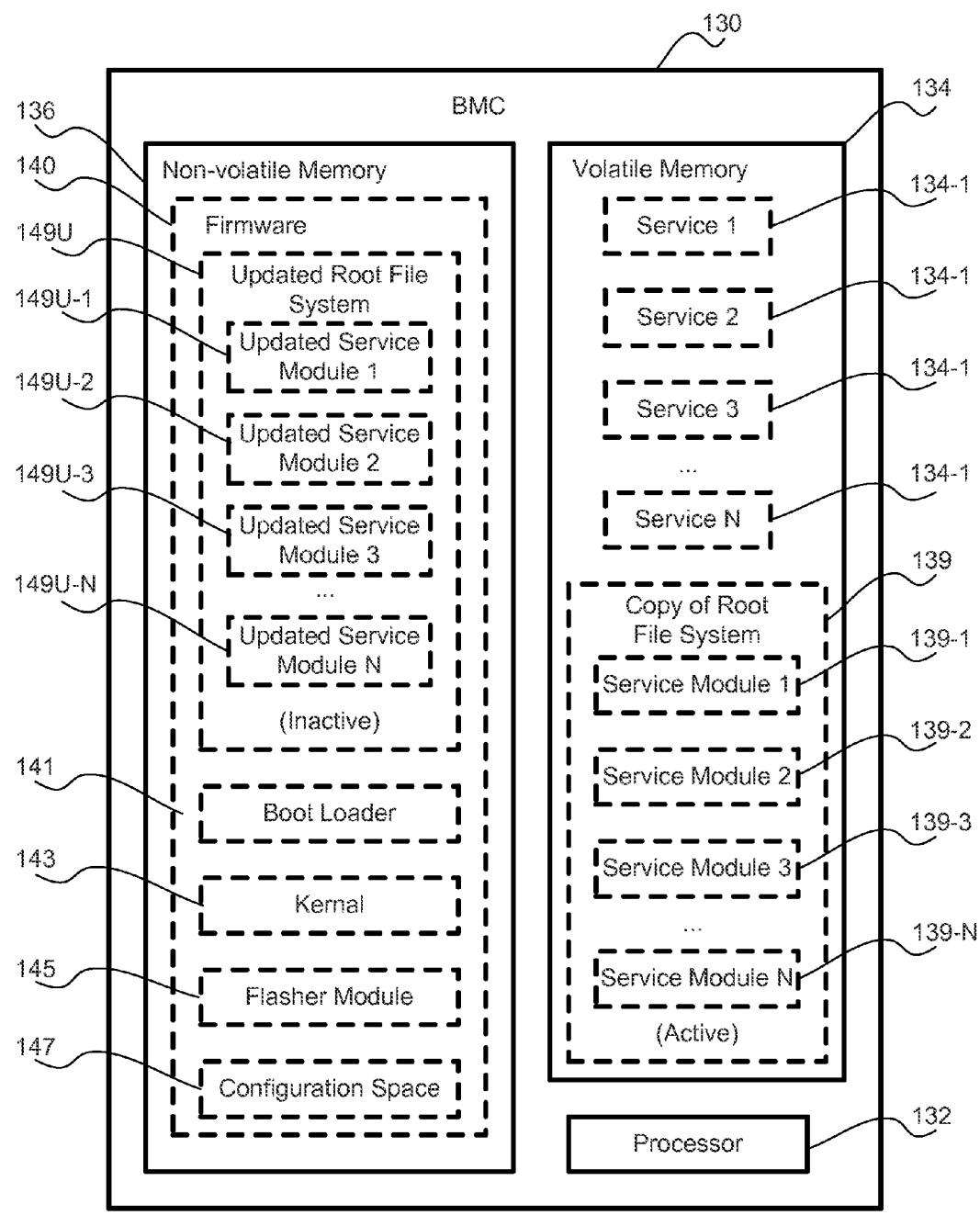
FIG. 3C schematically depicts a status of the BMC according to certain embodiments of the present disclosure, where updates is performed.

After the operation of writing 245, the system 100 has a status as shown in FIG. 3C. The root file system 149 is still inactive, the copy of the root file system 139 is still active, and the volatile memory 134 loads and unloads service 1, service 2, service 3, . . . , service N from the copy of the root file system 139. The difference between the status shown in FIG. 3C and the status shown in FIG. 3B is that the root file system 149 stored in the non-volatile memory 136 has been updated with the updated root file system 149U.

At this stage, the update or flashing of the non-volatile memory 136 is successfully achieved. However, since the service instances performed in the volatile memory 134 is running using the copy of the root file system 139, and the BMC 130 is fully active, it is not required to perform rebooting at this time.

Figure 3D:
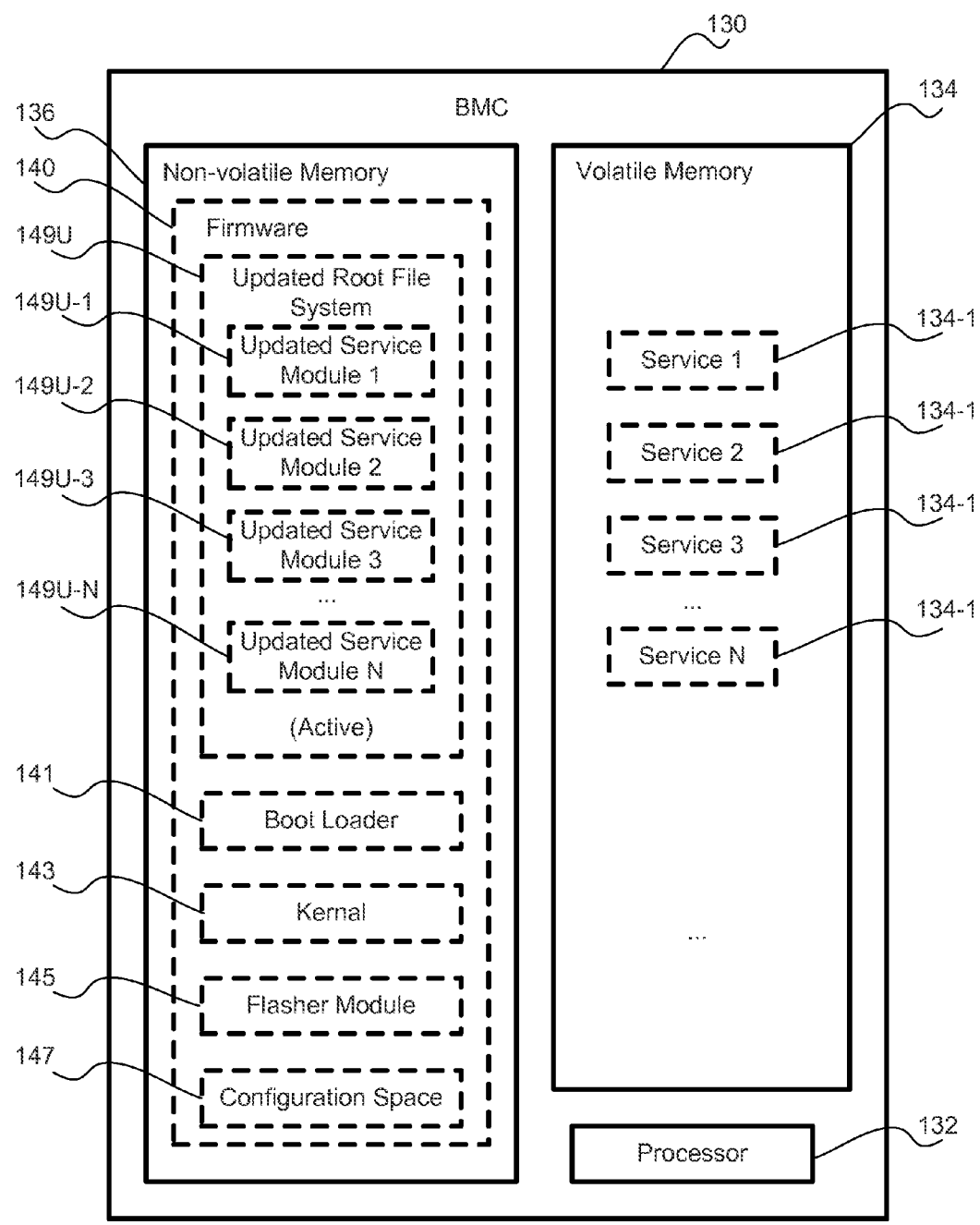
FIG. 3D schematically depicts a status of the BMC according to certain embodiments of the present disclosure, where rebooting is performed after updating the BMC.

When the administrator decide to reboot the BMC 130, or the system is configured to reboot the BMC 130 at predetermined time, such as during certain time of the night or certain time during the weekend, the reboot may be performed. After rebooting, as shown in FIG. 3D, the BMC 130 performs its function normally. The updated root file system 149U is active, and the volatile memory 134 loads and unloads service 1, service 2, service 3, . . . , service N from the updated root file system 149U. In other words, the volatile memory 134 now loads and unloads its services based on the updated root file system 149U of the non-volatile memory 136.

In a further aspect, the present disclosure is related to a non-transitory computer readable medium storing computer executable code. The code, when executed at one or more processer of a BMC 130, may perform the method as described above. In certain embodiments, the non-transitory computer readable medium may include, but not limited to, any physical or virtual storage media. In certain embodiments, the non-transitory computer readable medium may be implemented as the non-volatile memory 136 of the BMC 130 as shown in FIG. 1.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
a baseboard management controller (BMC), comprising a processor, a volatile memory configured to perform a plurality of service instances, and a non-volatile memory storing a computer executable code and a root file system, wherein the root file system is configured as an origin of the plurality of service instances, and wherein the computer executable code, when executed at the processor, is configured to:
receive an update command comprising instructions for updating the BMC; and
perform an update process based on the update command, the update process comprising:
activating the root file system in the non-volatile memory, wherein the plurality of service instances are loaded and unloaded from the root file system;
copying the root file system from the non-volatile memory to the volatile memory to form a copy of the root file system in the volatile memory;
switching the origin of the plurality of service instances from the root file system stored in the non-volatile memory to the copy of the root file system stored in the volatile memory;
receiving an update root file system code;
activating the copy of the root file system in the volatile memory, wherein the plurality of service instances are loaded and unloaded from the copy of the root file system;
writing the update root file system code to the non-volatile memory to obtain an updated root file system in the non-volatile memory, wherein the updated root file system comprises a plurality of updated service modules each corresponding to one of a plurality of updated service instances, wherein each of the updated service modules, when executed at the processor, is configured to re-create a corresponding one of the plurality of updated service instances in the volatile memory; and
activating the updated root file system in the non-volatile memory, wherein the plurality of updated service instances are loaded and unloaded from the updated root file system;
wherein the computer executable code comprises a flasher module, and the flasher module is configured to:
receive the update command; and
perform the update process based on the update command.

2. The system of claim 1, wherein the root file system comprises a plurality of service modules each corresponding to one of the plurality of service instances, wherein each of the service modules, when executed at the processor, is configured to create the corresponding one of the plurality of service instances in the volatile memory.

3. The system of claim 2, wherein when the BMC is rebooted after performing the update process, the plurality of service instances are configured to be recreated by executing the service modules of the updated root file system stored in the non-volatile memory.

4. The system of claim 1, wherein the update command and the update root file system code are received from a remote computing device connected to the BMC via a network.

5. The system of claim 4, wherein the update process further comprises:
in response to the update command, sending a request to the remote computing device via the network to request the update root file system code from the remote computing device.

6. The system of claim 1, wherein the volatile memory is a random-access memory (RAM), and the non-volatile memory is a flash memory.

7. The system of claim 1, wherein the computer executable code, when executed at the processor, is configured to perform the update process based on the update command by:
retrieving version information of the update root file system code;
retrieving version information of the root file system in the non-volatile memory;
comparing the version information of the update root file system code with the version information of the root file system in the non-volatile memory; and
performing the update process when the version information of the update root file system code is different from the version information of the root file system in the non-volatile memory.

8. A method of firmware update, comprising:
receiving, at a processor of a baseboard management controller (BMC), an update command comprising instructions for updating the BMC, wherein the BMC comprises the processor, a volatile memory configured to perform a plurality of service instances, and a non-volatile memory a root file system, and wherein the root file system is configured as an origin of the plurality of service instances; and
performing, at the processor of the BMC, an update process based on the update command, the update process comprising:
activating the root file system in the non-volatile memory, wherein the plurality of service instances are loaded and unloaded from the root file system;
copying the root file system from the non-volatile memory to the volatile memory to form a copy of the root file system in the volatile memory;
switching the origin of the service instances from the root file system stored in the non-volatile memory to the copy of the root file system stored in the volatile memory;
receiving an update root file system code;
activating the copy of the root file system in the volatile memory, wherein the plurality of service instances are loaded and unloaded from the copy of the root file system;
writing the update root file system code to the non-volatile memory to obtain an updated root file system in the non-volatile memory, wherein the updated root file system comprises a plurality of updated service modules each corresponding to one of a plurality of updated service instances, wherein each of the updated service modules, when executed at the processor, is configured to re-create a corresponding one of the plurality of updated service instances in the volatile memory; and activating the updated root file system in the non-volatile memory, wherein the plurality of updated service instances are loaded and unloaded from the updated root file system;

wherein computer executable code stored in the BMC comprises a flasher module, and the flasher module is configured to:

receive the update command; and perform the update process based on the update command.

9. The method of claim 8, wherein the root file system comprises a plurality of service modules each corresponding to one of the plurality of service instances, wherein each of the service modules, when executed at the processor, is configured to create the corresponding one of the plurality of service instances in the volatile memory.

10. The method of claim 9, further comprising:

rebooting the BMC after performing the update process; and executing the service modules of the updated root file system stored in the non-volatile memory to re-create the plurality of service instances.

11. The method of claim 8, wherein the update command and the update root file system code are received from a remote computing device connected to the BMC via a network.

12. The method of claim 11, wherein the update process further comprises:

in response to the update command, sending a request to the remote computing device via the network to request the update root file system code from the remote computing device.

13. The method of claim 8, wherein the update process is performed based on the update command by:

retrieving version information of the update root file system code;

retrieving version information of the root file system in the non-volatile memory;

comparing the version information of the update root file system code with the version information of the root file system in the non-volatile memory; and performing the update process when the version information of the update root file system code is different from the version information of the root file system in the non-volatile memory.

14. A non-transitory computer readable medium storing computer executable code executable at a processor of a baseboard management controller (BMC), wherein the BMC comprises the processor, a volatile memory configured to perform a plurality of service instances, and a non-volatile memory storing a root file system, wherein the root file system is configured as an origin of the plurality of service instances, and wherein the computer executable code, when executed at the processor of the BMC, is configured to:

receive an update command comprising instructions for updating the BMC; and perform an update process based on the update command, the update process comprising:

activating the root file system in the non-volatile memory, wherein the plurality of service instances are loaded and unloaded from the root file system;

copying the root file system from the non-volatile memory to the volatile memory to form a copy of the root file system in the volatile memory;

switching the origin of the plurality of service instances from the root file system stored in the non-volatile memory to the copy of the root file system stored in the volatile memory;

receiving an update root file system code;

activating the copy of the root file system in the volatile memory, wherein the plurality of service instances are loaded and unloaded from the copy of the root file system;

writing the update root file system code to the non-volatile memory to obtain an updated root file system in the non-volatile memory, wherein the updated root file system comprises a plurality of updated service modules each corresponding to one of a plurality of updated service instances, wherein each of the updated service modules, when executed at the processor, is configured to re-create a corresponding one of the plurality of updated service instances in the volatile memory; and activating the updated root file system in the non-volatile memory, wherein the plurality of updated service instances are loaded and unloaded from the updated root file system;

wherein computer executable code stored in the BMC comprises a flasher module, and the flasher module is configured to:

receive the update command; and perform the update process based on the update command.

15. The non-transitory computer readable medium of claim 14, wherein the root file system comprises a plurality of service modules each corresponding to one of the plurality of service instances, wherein each of the service modules, when executed at the processor, is configured to create the corresponding one of the plurality of service instances in the volatile memory.

16. The non-transitory computer readable medium of claim 15, wherein the computer executable code, when executed at the processor, is further configured to, after performing the update process:

reboot the BMC; and execute the service modules of the updated root file system stored in the non-volatile memory to re-create the plurality of service instances.

17. The non-transitory computer readable medium of claim 14, wherein the update command and the update root file system code are received from a remote device connected to the BMC via a network.

18. The non-transitory computer readable medium of claim 17, wherein the update process further comprises:

in response to the update command, sending a request to the remote computing device via the network to request the update root file system code from the remote computing device.

19. The non-transitory computer readable medium of claim 14, wherein the computer executable code, when executed at the processor, is configured to perform the update process based on the update command by:

retrieving version information of the update root file system code;

retrieving version information of the root file system in the non-volatile memory;

comparing the version information of the update root file system code with the version information of the root file system in the non-volatile memory; and performing the update process when the version information of the update root file system code is different from the version information of the root file system in the non-volatile memory.

\* \* \* \* \*